No. 695,861. Patented Mar. 18, 1902.
N. C. COTABISH.
ELECTRIC CONTACT DEVICE.
(Application filed Apr. 16, 1901.)
(No Model.)
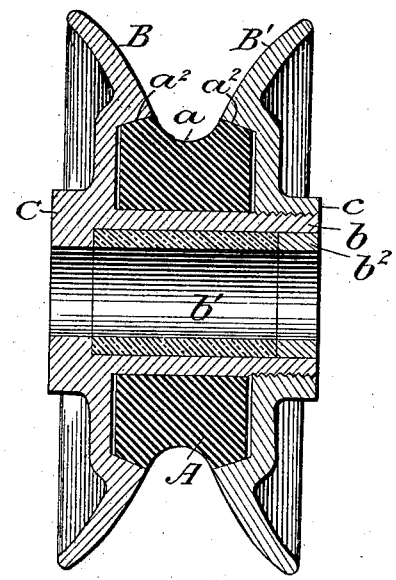

UNITED STATES PATENT OFFICE.

NELSON C. COTABISH, OF LAKEWOOD, OHIO.

ELECTRIC CONTACT DEVICE.

SPECIFICATION forming part of Letters Patent No. 695,861, dated March 18, 1902.

Application filed April 16, 1901. Serial No. 56,115. (No model.)

*To all whom it may concern:*

Be it known that I, NELSON C. COTABISH, a citizen of the United States, residing at Lakewood, in the county of Cuyahoga and State of Ohio, have invented certain new and useful Improvements in Electric Contact Devices, of which the following is a specification, reference being had therein to the accompanying drawings.

My invention relates to electric-current contact devices; and it appertains more especially to the features hereinafter pointed out in the annexed claims.

This invention has for its object the production of contact devices—such as street-railway trolleys, &c.—of a removable non-metallic material comprising the active contact and reinforcing metallic flanges projecting beyond the periphery of the contact portion and a bushing of lubricative conductive material forming an inner lining to the wheel-hub.

In practice I have found that a removable tread portion of a trolley-wheel composed wholly of carbon or like material without protecting side flanges soon breaks away sufficiently to destroy its usefulness, because of the inherent brittleness of carbon materials, however densely they may be made.

With these ends in view I illustrate in the accompanying drawing such features of adaptation as disclose the merits of the invention, without limiting myself to the specific interrelation of parts.

The contact device is formed with a central removable piece of carbon or other conductive material having a high specific resistance A. This is formed with a central hole and a contact-groove $a$ in its edge. The faces or rims $a^2$ on each side of the groove $a$ are made slightly conical, so as to fit into conical recesses of the side flanges B and B'.

In order to protect the carbonized portion of the device, I place it between the two side flanges B and B'. Flange B has formed thereon a projecting hub $b$, which is counterbored, and a conductive lubricating-bushing $b'$ is placed therein. This bushing is only used in contact devices partaking of the wheel form. It should be understood that I do not limit myself to a rotative form of contact device, as a sliding device would come equally within the scope of my present invention. Flange B' is screwed on the hub $b$, and it has a conical recess which abuts one of the faces $a^2$.

Within the projection $b$, at its outer end, is formed or placed a ring $b^2$, which is forced into place under considerable pressure. This ring serves to keep the conductive lubricating-bushing $b'$ in position against axial displacement, and by reason of the expansion of projection $b$ the flange B' is held against rotative disengagement without the use of locknuts, &c. The direction of the screw-thread is such as to be in opposition to the direction of rotation when the device is made in wheel form.

The conical recesses of flanges B and B' are of a greater depth than the conical faces or rims $a^2$, so that the carbon center A is positively alined by simply moving the flanges toward each other. This is a simple form of construction, which insures a rapidity of assembling in manufacture unattainable with parallel overlapping cylindrical portions. To secure ample axial dimensions, the flanges have formed thereon external hubs C and $c$.

The flanges B and B' beyond the carbon center A extend outwardly and flare away from the grooves $a$, so as to prevent easy displacement of the contact device from an electric conductor. Without the protecting and guiding flanges the carbon center, however desirable for electrical contact purposes, is found impracticable on account of the inherent brittleness of the material, which does not admit of flanges being formed thereon having the proper radial extension, and in consequence the device readily leaves the conductor, and in so doing as it severs contact therewith the edges of the rim are broken. An unprotected device of high specific resistance and non-metallic formation has such a short life that its use is impracticable.

My device combines all the valuable features of a contact portion susceptible to minimum arcing effects, with protecting members which at the same time serve as guiding flanges.

The terms "lubricative conducting material" or "conductive lubricating-bushing" are intended to cover all or any materials that have high lubricative and current-conducting properties at one and the same time.

Instead of counterboring the hub $b$ I may use two retaining-rings $b^2$, one at each end of the bushing.

What I claim is—

1. In electric-current contacts, a non-metallic conductive central portion of high specific resistance, in combination with protecting and guiding members of greater radial extension secured thereon of a relatively low specific resistance, substantially as set forth.

2. In electric-current contacts, a carbon central portion, metallic protecting and guiding flanges secured to each other and supporting said carbon center, in combination with a conductive lubricating-bushing concentric with the axis of said flanges.

3. In electric-current contacts, a plurality of contact-surfaces comprising in combination, a conductive center of high specific resistance and conductive side flanges projecting beyond said center, of relatively low specific resistance, substantially as set forth.

4. A composite contact device, comprising in combination, guiding metallic flanges of maximum radial extension and a carbon center of smaller diameter clamped between said flanges, substantially as set forth.

5. A composite device comprising a metallic flange, a projection formed thereon and a recess therein, a second metallic recess-formed flange, means for supporting and holding the second flange on said projection and a removable carbon member clamped between said flanges, within the recess thereof, substantially as set forth.

6. A composite contact device, comprising supporting and guiding flanges, oppositely-related tapering recesses formed therein, a removable carbon portion having tapering rims formed thereon supported between said flanges and within the recesses thereof, substantially as set forth.

7. A composite contact device, comprising side flanges and a non-metallic conducting member supported between said flanges, such member being formed of less diameter than said flanges.

8. A composite contact device comprising separable side flanges, a non-metallic conducting member removably held between the flanges, a lubricative conducting-bushing in one of the flanges, means for holding said bushing therein and the flanges against separation, substantially as set forth.

9. A non-metallic conducting member having tapering rims, guiding and supporting flanges having tapering recesses adapted to engage the said rims, and means for holding said flanges and rims against displacement.

10. A composite contact device, a central non-metallic portion supporting and guiding flanges therefor, a conductive lubricating-bushing within one of said flanges, and one or more retaining-rings in axial alinement and opposition to said bushing, substantially as set forth.

11. A contact device comprising a non-metallic contact portion means for holding said contact portion in position and a self-lubricating conductive bushing.

12. A contact device comprising two flanged plates, a carbon contact-block between said plates and an axial self-lubricating conductive bushing.

13. In a contact device, the combination with two flanged plates, one plate having an integral sleeve on which the other plate is removably secured, a non-metallic contact-block mounted on the sleeve and clamped between said plates and a lubricating conductive bushing disposed within said sleeve.

14. In electric-current contacts, a plurality of contact-surfaces comprising in combination, a conductive center and conductive side flanges projecting beyond the center, said center and said flanges being of different specific resistances, substantially as set forth.

In testimony whereof I affix my signature in presence of two witnesses.

NELSON C. COTABISH.

Witnesses:
EDMUND J. CLIMO,
ARTHUR G. SUMMERELL.